Nov. 6, 1928.                                          1,690,788
J. KRUSCHITZKI
SPEEDOMETER
Filed April 30, 1926
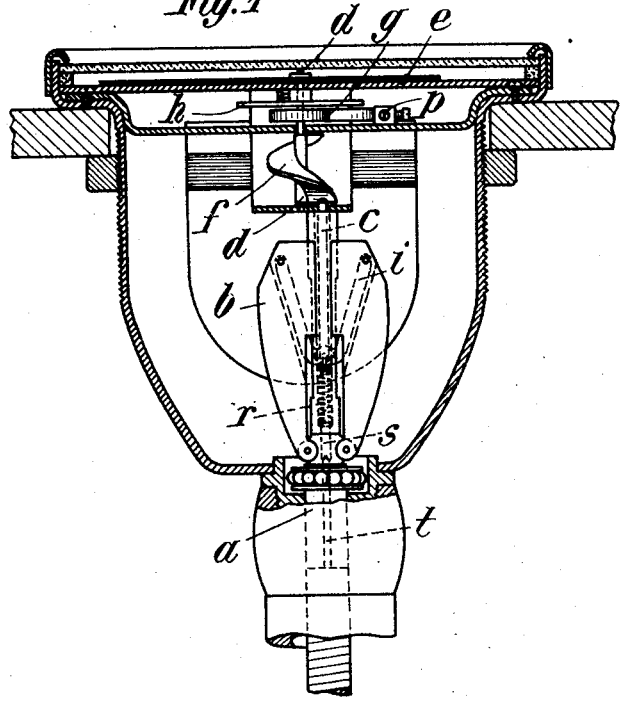
Fig. 1
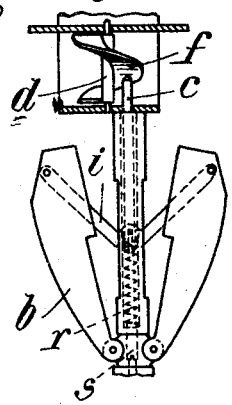
Fig. 2
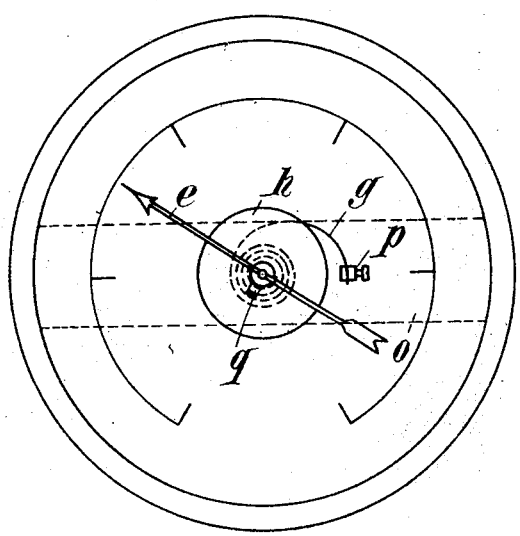
Fig. 3
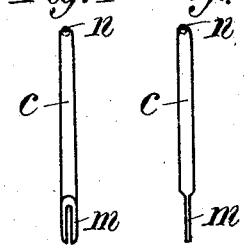 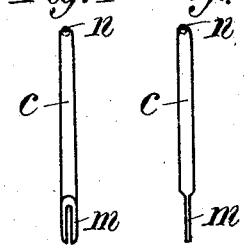
Fig. 4  Fig. 5
Fig. 6
Fig. 7
Inventor:
J. Kruschitzki
By: Marks & Clerk
Attys Patented Nov. 6, 1928.

1,690,788

UNITED STATES PATENT OFFICE.

JOHANN KRUSCHITZKI, OF COBURG, GERMANY, ASSIGNOR TO METALLWERK MAX BROSE & CO., OF COBURG, GERMANY, A CORPORATION OF GERMANY.

SPEEDOMETER.

Application filed April 30, 1926, Serial No. 105,885, and in Germany August 1, 1925.

This invention relates to a centrifugal speedometer, more particularly for motor vehicles, in which the centrifugal force is transmitted by a screwthread to a pointer spindle, and consists chiefly in that the pointer spindle which is parallel to the driven shaft carrying the centrifugal means is arranged slightly laterally relatively to said shaft, and in that a pin coaxially mounted on the shaft of the centrifugal means, presses directly against the helical surface connected to the pointer. In that way, a simple construction is obtained which causes little friction, and the separate supporting of the pointer- and rotating weights-spindle ensures that vibrations of the vehicle do not cause any oscillations of the pointer.

A construction according to the invention is illustrated by way of example in the accompanying drawing in which Figures 1 and 2 show in vertical section two positions of the governor, Figure 3 is a plan and Figures 4 to 7 are detail views.

To the main shaft $a$ as a rule driven by a flexible shaft, are pivoted the rotating weights $b$ which are connected by rods $i$ to a pin $c$ and during their movement cause the said pin to move up and down. The said weights are connected by a link $k$ to a pin $l$ (Figures 6 and 7). The lower end of the pin $c$ is flattened and forked at $m$ (Figures 4 and 5) to engage loosely over the pin $l$ of the link $k$. The pin $c$ engages with a screwthread $f$ provided on a spindle $d$ of a pointer $c$.

As more particularly shown in Figure 2, during the working of the centrifugal governor, the pin $c$ will be raised, and thereby will turn the pointer $e$ without any further transmission gear. As there is no firm connection between the parts $i$ and $c$, the pin $c$ will merely press against the thread $f$, without however pushing it aside. In order still further to reduce the friction between the pin and the screwthread, a steel ball $n$ is mounted in the upper end of the pin.

Above the screwthread is arranged a spring $g$ adapted to return the pointer $e$ to the zero position, this spring being secured on the one hand to a disc $h$ arranged above the spring, and on the other hand to a fixed cross bar $o$, by means of a set screw $p$ so that its length is adjustable. The disc $h$ is connected by means of a set screw $q$ to the spindle $d$.

The setting is effected by loosening the screw $q$ and more or less stressing the spring $g$ by turning the disc $h$ in one or in the other direction. A further regulation can be effected by means of the screw $p$.

In order to enable the speedometer to be set also for small speeds, under the pin $c$ is provided a spring $r$, the lower end of which presses against a set screw $s$ which can be adjusted in a longitudinal slot, so that the tension of the spring can be regulated as desired by means of this screw.

Having now particularly described and ascertained the nature of my said invention and in what manner the same is to be performed, I declare that what I claim is:—

1. In a speedometer, a driven shaft carrying fly weights pivotally connected by rods, a sliding pin sitting with its lower end on the joint connecting the rods of the fly weights said sliding pin being pushed by said joint, a spring to hold the said joint pressed against the sliding pin, a pointer spindle carrying a screwthread arranged laterally and parallel to the driven shaft and rotated by direct pressure of said pushed pin against the screwthreads surface, a spring on said pointer spindle for returning the pointer to the zero position.

2. In a speedometer, a driven shaft carrying fly weights pivotally connected by rods, a link between said rods, a sliding pin engaging with its lower forked end a spindle of said link, said sliding pin being pushed by said spindle, an adjustable spring to hold the link engaged with the forked end of the sliding pin, a pointer spindle carrying a screwthread arranged laterally and parallel to the driven shaft and rotated by direct pressure of said pushed pin against the helical surface of the screwthread, a spring adjustable in length and tension on said pointer spindle for returning the pointer to the zero position.

In testimony whereof I affix my signature.

JOHANN KRUSCHITZKI.